United States Patent Office 3,250,719
Patented May 10, 1966

3,250,719
FOAMING DETERGENT COMPOSITIONS
Irving R. Schmolka and John W. Compton, Grosse Ile, Mich., assignors to Wyandotte Chemicals Corporation, Wyandotte, Mich., a corporation of Michigan
No Drawing. Filed Sept. 30, 1963, Ser. No. 312,368
10 Claims. (Cl. 252—152)

This application is a continuation-in-part of application Serial No. 92,765, filed March 2, 1961, now abandoned.

This present invention relates to detergent compositions having enhanced and stabilized foaming characteristics and more particularly it relates to such compositions which contain nonionic detergents.

In general nonionic detergents have comparatively poor foam characteristics when compared to ionic detergents which they replaced. This makes it difficult for the user to determine the proper concentration and the rinse end point when using such detergents. It would be an advantage to the user if these nonionic detergents possessed foam characteristics comparable to the heavy duty soaps which they replaced.

Therefore it is an object of the present invention to provide a nonionic detergent composition having improved foam characteristics.

It has now been discovered that the incorporation of any of a group of acetamides or butyramides in detergent compositions comprising water-soluble nonionic polyalkylene oxide detergents is effective to improve the foam characteristics of such detergents. The foam improving additives in the composition of the present invention are acetamides of the general formula:

Formula A

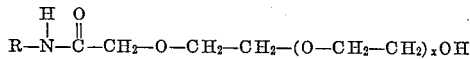

and butyramides of the general formula:

Formula B

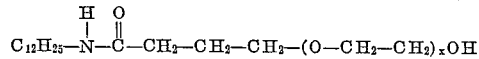

wherein R represents an alkyl, alkenyl, or alkynl radical containing from 8 to 22 carbon atoms and $x$ is an integer from 0 to 100.

Examples of suitable additives corresponding to Formula A are

N - octyl-$\beta$-hydroxyethoxy acetamide, N-dodecyl-$\beta$-hydroxyethoxy acetamide, N-octadecyl-$\beta$-hydroxyethoxy acetamide, N-eicosyl-$\beta$-hydroxyethoxy acetamide, N-decenyl-$\beta$-hydroxyethoxy acetamide, N-docosenyl-$\beta$-hydroxyethoxy acetamide, N-pentadecenyl-$\beta$-hydroxyethoxy acetamide, N-nonyl-$\beta$-hydroxyethoxy acetamide, N-heneicosenyl-$\beta$-hydroxyethoxy acetamide;

the one mol ethylene oxide adduct of N-dodecyl-$\beta$-hydroxyethoxy acetamide, N-octadecyl-$\beta$-hydroxyethoxy acetamide, N-octenyl-$\beta$-hydroxyethoxy acetamide, N-tridecenyl-$\beta$-hydroxyethoxy acetamide, N-undecenyl-$\beta$-hydroxyethoxy acetamide, N-nonadecenyl-$\beta$-hydroxyethoxy acetamide;

the two mol ethylene oxide adduct of N-dodecyl-$\beta$-hydroxyethoxy acetamide, N-hexadecyl-$\beta$-hydroxyethoxy acetamide, N-nonenyl-$\beta$-hydroxyethoxy acetamide, N-eicosenyl-$\beta$-hydroxyethoxy acetamide, N-octynl-$\beta$-hydroxyethoxy acetamide, N-octadecynl-$\beta$-hydroxyethoxy acetamide;

the four mol ethylene oxide adduct of N-octyl-$\beta$-hydroxyethoxy acetamide, N-dodecyl-$\beta$-hydroxyethoxy acetamide, N-tridecynl-$\beta$-hydroxyethoxy acetamide, N-heptadecenyl-$\beta$-hydroxyethoxy acetamide, N-nonyl-$\beta$-hydroxyethoxy acetamide, N-pentadecynl-$\beta$-hydroxyethoxy acetamide;

the ten mol ethylene oxide adduct of N-dodecyl-$\beta$-hydroxyethoxy acetamide, N-eicosyl-$\beta$-hydroxyethoxy acetamide, N-decenyl-$\beta$-hydroxyethoxy acetamide, N-nonadecenyl-$\beta$-hydroxyethoxy acetamide, N-decynl-$\beta$-hydroxyethoxy acetamide, N-tetradecynl-$\beta$-hydroxyethoxy acetamide;

the 25 mol ethylene oxide adduct of N-nonyl-$\beta$- hydroxyethoxy acetamide, N-dodecyl-$\beta$-hydroxyethoxy acetamide, N-undecenyl-$\beta$-hydroxyethoxy acetamide, N-heneicosenyl-$\beta$-hydroxyethoxy acetamide, N-tridecynl-$\beta$-hydroxyethoxy acetamide, N-docosynl-$\beta$-hydroxyethoxy acetamide;

the 50 mol ethylene oxide adduct of N-dodecyl-$\beta$-hydroxyethoxy acetamide, N-docosynl-$\beta$-hydroxyethoxy acetamide, N-octenyl-$\beta$-hydroxyethoxy acetamide, N-eicosenyl-$\beta$-hydroxyethoxy acetamide, N-nonynl-$\beta$-hydroxyethoxy acetamide, N-octadecynl-$\beta$-hydroxyethoxy acetamide;

and the 100 mol ethylene oxide adduct of N-octyl-$\beta$-hydroxyethoxy acetamide, N-dodecyl-$\beta$-hydroxyethoxy acetamide, N-docosynl-$\beta$-hydroxyethoxy acetamide, N-nonenyl-$\beta$-hydroxyethoxy acetamide, N-heneicosenyl-$\beta$-hydroxyethoxy acetamide, N-decynl-$\beta$-hydroxyethoxy acetamide, N-eicosynl-$\beta$-hydroxyethoxy acetamide.

Examples of suitable additives corresponding to Formula B are

N-(n-dodecyl)-$\gamma$-hydroxybutyramide,
the one mol ethylene oxide adduct of N-(n-dodecyl)-$\gamma$-hydroxybutyramide,
the four mol ethylene oxide adduct of N-(n-dodecyl)-$\gamma$-hydroxybutyramide,
the ten mol ethylene oxide adduct of N-(n-dodecyl)-$\gamma$-hydroxybutyramide,
the 50 mol ethylene oxide adduct of N-(n-dodecyl)-$\gamma$-hydroxybutyramide,
and the 100 mol ethylene oxide adduct of N-(n-dodecyl)-$\gamma$-hydroxybutyramide.

The N-alkyl, -alkenyl, or -alkynl - $\beta$ - hydroxyethoxy acetamide is the condensation product of the reaction between the corresponding primary amine and 2-p-dioxanone. Examples of suitable primary amines are dodecyl amine, hexadecyl amine, octadecenyl amine, octyl amine, hexadecynl amine, eicosynl amine, decenyl amine, tetradecenyl amine, docosynl amine, and octenyl amine. 2-p-dioxanone is a known chemical made by the catalytic dehydrogenation of diethylene glycol, generally over a copper-chromium catalyst as disclosed in U.S. Patents Nos. 2,142,033 and 2,807,629. The reaction between 2-p-dioxanone and a primary amine proceeds upon the mixing of the two reactants. The reaction product is represented by the general formula:

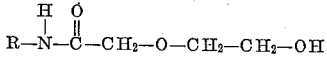

wherein R represents an alkyl, alkenyl, or alkynl radical containg 8 to 22 carbon atoms. The ethoxylated derivatives of the N-alkyl, -alkenyl, or -alkynl-$\beta$-hydroxyethoxy acetamide are prepared by reacting ethylene oxide with the N-alkyl, -alkenyl, or -alkynl-$\beta$-hydroxyethoxy acetamide in the presence of a basic catalyst such as NaOH at a temperature of 125° C. and a maximum pressure of 90 p.s.i. The ethylene oxide is believed to add on to the terminal hydroxy group of the acetamide. It is well known in the art that the addition of oxyethyl groups will increase the water solubility of the base compound. The following is believed to represent the general formula:

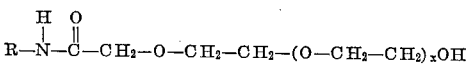

wherein R represents an alkyl, alkenyl, or alkynl radical containing from 8 to 22 carbon atoms and $x$ represents 0 to 100.

The additive N - (n - dodecyl) - γ - hydroxybutyramide which corresponds to Formula B is manufactured and sold by General Aniline and Film Corporation under the trademark Agent AT-341. The ethylene oxide adducts of N-(n-dodecyl)-γ-hydroxybutyramide are prepared by ethoxylating the N - (n - dodecyl)-γ-hydroxybutyramide under a maximum pressure of 90 p.s.i. and in the presence of a basic catalyst such as NaOH. It is believed the ethylene oxide adds on to the terminal hydroxy group. The polyoxyethylene hydrophilic chain simply increases the water solubility of the base compound. The following is believed to represent the general formula:

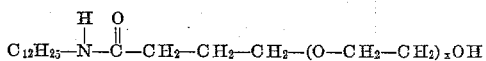

wherein $x$ is an integer from 0 to 100.

The detergent component of the present invention is a water-soluble nonionic polyalkylene oxide detergent produced by the introduction of a controlled number of hydrophilic oxyethyl groups into an organic hydrophobic compound or group usually of an aliphatic or aromatic structure. These detergents are known in the art and the determination of a specific hydrophilic:hydrophobic relationship for each type is not the essential novelty of the present invention. Among the suitable nonionic detergents are the surface active cogeneric mixtures of conjugated polyoxyalkylene compounds of the formula:

Formula C

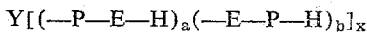

wherein Y is an organic radical derived from an organic compound containing $x$ number of reactive hydrogen atoms and has a detergency factor of less than 100, $x$ is an integer of about 1 to 6, $a$ and $b$ are whole numbers in the range of 0 to 1, inclusive, and the sum of $a+b$ is 1, P is a hydrophobic polyoxyalkylene chain having an average oxygen/carbon atom ratio of not more than 0.40, the number of oxyalkylene groups in said hydrophobic chain and the value of $x$ being such that the cogeneric mixture, excluding E, has a detergency of greater than 100, and E is a hydrophilic polyoxyalkylene chain wherein the oxygen/carbon atom ratio is at least 0.40 and constitutes 30 to 90% by weight of the compound.

The term "cogeneric" and the test for determining the detergency factor are defined in column 13 of U.S. Patent No. 2,674,619.

Representative compounds of the above formula are the polyoxyalkylene compounds described in U.S. Patent No. 2,674,619, the polyoxyalkylene surface agents described in U.S. Patent No. 2,677,700, the detergent mixtures of conjugated polyoxyethylene-polyoxypropylene compounds described in Canadian Patent No. 538,842, the mixtures of novel polyoxyalkylene compounds described in Canadian Patent No. 538,843, the polyoxyalkylene compounds described in Canadian Patent No. 594,754, and the polyoxyalkylene surface active agents described in Canadian Patent No. 595,207.

A typical group of compounds representative of Formula C are the conjugated polyoxypropylene-polyoxyethylene compounds containing in their structure the nucleus of ethylene diamine, oxypropylene groups, and oxyethylene groups. The structure of the compounds is such that all of the oxypropylene groups are present in oxypropylene chains that are attached to the reactive hydrogen compound at the sites of the reactive hydrogen atoms, and all the oxyethylene groups are present in oxyethylene chains that are attached to the ends of the oxypropylene chains. The average molecular weight of the oxypropylene chains must be at least about 900 and up to 25,000, and the oxyethylene groups being present in an amount so as to constitute from 30 to 90 weight percent of the mixture of compounds.

The product of the sequential addition of propylene oxide and ethylene oxide to ethylene diamine may be represented by the formula:

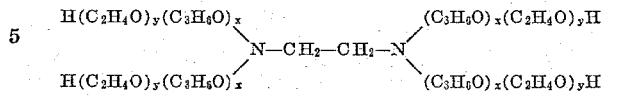

wherein $x$ is sufficiently large to provide a molecular weight of the oxypropylene chains of at least about 900 and wherein $y$ is sufficiently large to provide 30 to 90% of the total molecular weight of the compound.

Compounds in this class are described in U.S. Patent No. 2,674,619 and are sold commercially by the Wyandotte Chemicals Corporation under the trademark Tetronic. The following are examples of compounds corresponding to the above formula:

TABLE I

| Name | Molecular weight for ethylene diamine-propylene oxide base | Ethylene oxide content in final product, weight percent | Molecular weight of final product |
|---|---|---|---|
| Tetronic 304 | 935 | 45 | 1,700 |
| Tetronic 504 | 1,870 | 45 | 3,400 |
| Tetronic 704 | 2,970 | 45 | 5,400 |
| Tetronic 707 | 3,000 | 75 | 12,000 |
| Tetronic 904 | 4,120 | 45 | 7,500 |
| Tetronic 908 | 4,050 | 85 | 27,000 |

Another group of compounds representative of Formula C are the water-soluble conjugated polyoxypropylene-polyoxyethylene compounds containing in their structure oxypropylene groups, oxyethylene groups, and the nucleus of propylene glycol. The average molecular weight of the polyoxypropylene polymers must be at least 900 with the oxyethylene groups present constituting 30 to 90% of the weight. Ethylene oxide is condensed with a hydrophobic base formed by the condensation of propylene oxide with propylene glycol and the product can be represented by the formula:

$$HO(C_2H_4O)_a(C_3H_6O)_b(C_2H_4O)_cH$$

wherein $b$ is an integer sufficiently high to provide a molecular weight of at least 900 for the oxypropylene base and wherein $a+c$ is an integer sufficiently high to provide 30 to 90% of the total molecular weight of the compound.

Compounds in this class are described in U.S. Patent No. 2,674,619 and are sold commercially by the Wyandotte Chemicals Corporation under the trademark Pluronic. The following are examples of compounds corresponding to the above formula:

TABLE II

| Name | Molecular weight polyoxypropylene base | Ethylene oxide content in final product, weight percent | Molecular weight of final product |
|---|---|---|---|
| Pluronic L44 | 1,200 | 40 | 2,000 |
| Pluronic L64 | 1,700 | 40 | 2,800 |
| Pluronic F68 | 1,700 | 80 | 8,750 |
| Pluronic P75 | 2,050 | 50 | 4,100 |

Additional suitable nonionic detergents are the polyoxyethylene ethers of higher aliphatic monohydroxy alcohols. Suitable fatty alcohols having a hydrophobic character and preferably 8 to 22 carbon atoms are lauryl, myristyl, cetyl, stearyl, and oleyl alcohols which may be condensed with an appropriate amount of ethylene oxide such as at least about 6, and preferably about 10 to 30 mols. A typical product is tallow alcohol condensed with about 6, 12, 15 or 20 mols of ethylene oxide.

The particular foam additive to be employed depends upon the foam characteristics desired and the temperature at which the detergent composition is to be used. The acetamides and butyramides containing little or no ethylene oxide have a lower cloud point than those containing 1 or more mols of ethylene oxide and are, therefore, more suitable for use at temperatures below about 120° F. The acetamides and butyramides may be present in such proportions ranging from a ratio of 1 part by weight of acetamide or butyramide to 1,000 parts by weight of nonionic detergent to 1,000 parts by weight of acetamide or butyramide to 1 part by weight of nonionic detergent. Good results are obtained using 1 to 500 parts of acetamide or butyramide per 1,000 parts by weight of nonionic detergent. A more preferred range are compositions containing from 15 to about 100 parts of acetamide or butyramide per 1,000 parts by weight of nonionic detergent. This invention also contemplates that the foam additive component within the foregoing proportions may consist of a mixture of a butyramide and an acetamide. Likewise, the nonionic detergent component may consist of a mixture of various nonionic detergents described above.

The detergent compositions may be prepared by dissolving the acetamide or butyramide into the nonionic detergent when the nonionic detergent is a liquid by melting the two components together and then cooling when the detergent is a solid. The compositions of this invention may be in the form of solutions, pastes, granules or powders.

The following examples are presented to particularly illustrate the invention but should not be used to limit unduly the scope of the invention.

EXAMPLE 1

A series of detergent compositions was prepared; each consisted of a nonionic detergent and a foaming agent. Aqueous solutions were prepared from these detergent compositions and from each nonionic alone. The foaming properties of the compositions of this invention, the nonionic detergents themselves and the foam agents themselves were determined by the following described test procedure.

*Foam height test procedure*

To evaluate the foam characteristics of the compositions of this invention a 0.01% by weight solution of the composition (nonionic detergent plus foaming agent) to be tested was prepared in tap water and 10 liters of the solution were placed in a Pyrex jar measuring 10" in diameter and 10" in height. This Pyrex jar was equipped with a propeller-type stirrer, knife blade heaters, a thermoregulator and a thermometer. A small centrifugal pump was arranged to circulate the solution contained in this jar through a calibrated glass flow meter to a jet orifice prepared from the base of a No. 20 Becton-Dickinson & Co. hypodermic needle by enlarging the hole in the base with a No. 56 twist drill. The jet orifice was mounted coaxially inside a Pyrex glass tube (51 mm. by 910 mm.) which was placed vertically in the solution. The jet was positioned so that it was 700 mm. above the surface of the solution in the jar, and the Pyrex tube was arranged to project 210 mm. below the surface of the solution.

The solution was brought to temperature by means of the knife blade heater and maintained at a constant temperature by means of a thermoregulator. The centrifugal pump was started and the flow rate of solution was metered through the jet. The flow was adjusted by by-passing part of the stream back into the Pyrex jar before passage through the flow-meter. The solution passing through the jet was directed against the wall of the vertical tube while the flow was adjusted and the temperature was equilibrated to prevent foaming prior to the actual determination. The jet was then arranged to pass the solution coaxially downward through the tube touching the tube walls to impinge upon the surface of the solution located in the Pyrex tube. Timing was initiated from the instant the solution impinged on the liquid surface, and the foam height was read at the end of 10 minutes. The foam height readings were obtained from a calibration on the outside of the Pyrex tube with the zero mark being at the surface of the solution. This procedure was followed to evaluate the foam characteristics of the nonionic detergent itself and the foaming agent itself. A 0.10% by weight solution of the nonionic detergent was tested and a 0.002% by weight solution of the foaming agent was tested. The following table presents the detergent compositions and foam characteristics:

DYNAMIC FOAM TEST

| Composition No. | Detergent composition | | Parts foam additive/ 1,000 pts. detergent composition | Percent soln. of detergent composition | Flow rate, ml./min. | Solution temp., °F. | Foam height (mm.) | | | | | | | |
|---|---|---|---|---|---|---|---|---|---|---|---|---|---|---|
| | Nonionic detergent | Foam additive | | | | | Ascent (min.) | | | | Descent (min.) | | | |
| | | | | | | | 0.5 | 2 | 5 | 10 | 0.5 | 2 | 5 | 10 |
| 1 | None | N,n-dodecyl-β-hydroxyethoxy acetamide plus 4 mols ethylene oxide. | | 0.002 | 400 | 100 | 20 | 20 | 20 | 20 | 20 | 20 | 20 | 15 |
| 2 | None | N,n-dodecyl-β-hydroxyethoxy acetamide plus 2 mols ethylene oxide. | | 0.002 | 400 | 100 | 15 | 20 | 20 | 20 | 20 | 20 | 20 | 20 |
| 3 | None | N,n-dodecyl-β-hydroxyethoxy acetamide. | | 0.002 | 400 | 100 | 12 | 12 | 12 | 12 | 12 | 12 | 12 | 12 |
| 4 | Ethylene oxide condensate of polypropylene glycol containing about 60% ethylene oxide and a molecular weight of about 4,400 (Pluronic P66). | None | | 0.1 | 200 | 120 | 60 | 180 | 305 | 530 | 510 | 485 | 360 | 110 |
| 5 | Pluronic P66 | N,n-dodecyl-β-hydroxyethoxy acetamide plus 4 mols ethylene oxide. | 20 | 0.1 | 200 | 120 | 95 | 300 | 600 | ------ | 590 | 580 | 560 | 540 |
| 6 | Ethylene oxide condensate of polypropylene glycol containing about 40% ethylene oxide and a molecular weight of about 2,000 (Pluronic L44). | None | | .1 | 400 | 100 | 50 | 120 | 155 | 150 | 80 | 25 | 0 | 0 |
| 7 | Pluronic L44 | N,n-dodecyl-β-hydroxyethoxy acetamide plus 4 mols ethylene oxide. | 20 | .1 | 400 | 100 | 180 | 570 | ------ | ------ | 565 | 550 | 530 | 510 |

DYNAMIC FOAM TEST—Continued

| Composition No. | Detergent composition | | Parts foam additive/ 1,000 pts. detergent composition | Percent soln. of detergent composition | Flow rate, ml./min. | Solution temp., °F. | Foam height (mm.) | | | | | | | |
|---|---|---|---|---|---|---|---|---|---|---|---|---|---|---|
| | Nonionic detergent | Foam additive | | | | | Ascent (min.) | | | | Descent (min.) | | | |
| | | | | | | | 0.5 | 2 | 5 | 10 | 0.5 | 2 | 5 | 10 |
| 8 | Pluronic L44 | N,n-dodecyl-β-hydroxyethoxy acetamide plus 2 mols ethylene oxide. | 20 | .1 | 400 | 100 | 155 | 530 | [1]600 | | 600 | 600 | 590 | 570 |
| 9 | Pluronic L44 | N,n-dodecyl-β-hydroxyethoxy acetamide. | 20 | .1 | 400 | 100 | 55 | 85 | 125 | 160 | 155 | 155 | 150 | 150 |
| 10 | Pluronic L44 | N-(n-dodecyl)-γ-hydroxybutyramide. | 20 | .1 | 400 | 100 | 35 | 85 | 75 | 65 | 60 | 55 | 50 | 50 |
| 11 | Condensation product of the sequential addition of propylene oxide and ethylene oxide to ethylene diamine containing about 45% ethylene oxide and a molecular weight of about 1,700 (Tetronic 304). | None | | .1 | 400 | 120 | 170 | 485 | 515 | 525 | 525 | 170 | 0 | 0 |
| 12 | Tetronic 304 | N,n-dodecyl-β-hydroxyethoxy acetamide. | 20 | .1 | 400 | 120 | 100 | 215 | 390 | [2]690 | 670 | 660 | 640 | 620 |
| 13 | Condensation product of the sequential addition of propylene oxide and ethylene oxide to ethylene diamine containing about 45% ethylene oxide and a molecular weight of about 3,400 (Tetronic 504). | None | | .1 | 400 | 120 | 65 | 140 | 230 | 490 | 460 | 330 | 170 | 40 |
| 14 | Tetronic 504 | N,n-dodecyl-β-hydroxyethoxy acetamide. | 20 | .1 | 400 | 120 | 85 | 255 | 655 | [3]690 | 680 | 670 | 640 | 620 |
| 15 | Condensation product of the sequential addition of propylene oxide and ethylene oxide to ethylene diamine containing about 45% ethylene oxide and a molecular weight of about 5,400 (Tetronic 704). | None | | .1 | 400 | 120 | 150 | 425 | 645 | 650 | 640 | 580 | 570 | 350 |
| 16 | Tetronic 704 | N,n-dodecyl-β-hydroxyethoxy acetamide. | 20 | .1 | 400 | 120 | 95 | 265 | 660 | [4]690 | 680 | 650 | 540 | 450 |
| 17 | Condensation product of the sequential addition of propylene oxide and ethylene oxide to ethylene diamine containing about 75% ethylene oxide and a molecular weight of about 12,000 (Tetronic 707). | None | | .1 | 300 | 120 | 60 | 140 | 330 | 550 | 520 | 510 | 480 | 375 |
| 18 | Tetronic 707 | N,n-dodecyl-β-hydroxyethoxy acetamide. | 20 | .1 | 300 | 120 | 85 | 320 | 555 | 620 | 620 | 610 | 595 | 575 |
| 19 | Condensation product of tallow alcohol with 6 mols of ethylene oxide (Siponic E3). | None | | .1 | 400 | 100 | 35 | 65 | 140 | 260 | 260 | 255 | 250 | 245 |
| 20 | Siponic E3 | N,n-dodecyl-β-hydroxyethoxy acetamide plus 4 mols ethylene oxide. | 20 | .1 | 400 | 100 | 40 | 75 | 165 | 380 | 375 | 375 | 360 | 335 |

[1] 2.3 min.  [2] 9.5 min.  [3] 7.7 min.  [4] 6 min.

Tests 1, 2, and 3 illustrate the low foaming characteristics of three foam additives employed in solutions containing no nonionic detergent. A comparison of tests 5, 7, 8, 9, 12, 14, 16, 18, and 20 containing a nonionic detergent and N-(n-dodecyl)-β-hydroxyethoxy acetamide or an ethylene oxide adduct of N-(n-dodecyl)-β-hydroxyethoxy acetamide with tests 4, 6, 11, 13, 15, 17, and 19 wherein the compositions contained only a nonionic detergent points out that the compositions containing a foam additive have enhanced and stabilized foam. The data of tests 6 and 10 illustrate that the addition of N-(n-dodecyl)-γ-hydroxybutyramide to a detergent composition containing a nonionic detergent stabilized the foam; for example, the foam height was 0 mm. after a 10 minute descent for the nonionic detergent alone while the foam height was 50 mm. after a 10 minute descent when the foam additive was employed in the detergent composition.

EXAMPLE 2

A detergent composition was prepared which consisted of an N-(n-octyl)-β-hydroxyethoxy acetamide as the foaming agent and Pluronic polyol L-64 as the nonionic detergent wherein the ratio of foam additive to nonionic detergent was 20 to 1000. A 0.1% solution was made of the detergent composition and a qualitative test of the foaming properties was performed by simultaneously inverting mixing cylinders, one containing the 0.1% detergent composition solution and another containing a 0.1% solution of the nonionic detergent itself. The foam was found to be enhanced and stabilized in the cylinder containing the foaming agent.

EXAMPLE 3

A detergent composition was prepared which consisted of an N-(n-octadecyl)-β-hydroxyethoxy acetamide as the foaming agent and Pluronic polyol L–64 as the nonionic detergent wherein the ratio of foam additive to nonionic detergent was 20 to 1000. A 0.1% solution was made of the detergent composition and a qualitative test of the foaming properties was preformed by simultaneously inverting mixing cylinders, one containing the 0.1% detergent composition solution and another containing a 0.1% solution of the nonionic detergent itself. The foam was found to be enchanced and stabilized in the cylinder containing the foaming agent.

EXAMPLE 4

A detergent composition was prepared which consisted of an N-(n-dodecyl)-γ-hydroxybutyramide as the foaming agent and Pluronic polyol L–64 as the nonionic detergent wherein the ratio of foam additive to nonionic detergent was 20 to 1000. A 0.1% solution was made of the detergent composition and a qualitative test of the foaming properties was performed by simultaneously inverting mixing cylinders, one containing the 0.1% detergent composition solution and another containing a 0.1% solution of the nonionic detergent itself. The foam was found to be enhanced and stabilized in the cylinder containing the foaming agent.

EXAMPLE 5

Two detergent formulations including various "detergent builders" were prepared. The formulations, in parts by weight, consisted of 25 trisodium phosphate, 20 sodium carbonate, 50 sodium silicate, 5 water and 5 surfactant. In the first formulation, hereinafter referred to as Formulation A, the surfactant consisted of 5 parts of Pluracol polyol F–68. In the second formulation, hereinafter referred to as Formulation B, the surfactant consisted of 4.5 parts of Pluracol polyol F–68 and 0.5 part of N-(n-dodecyl)-γ-hydroxybutyramide foaming agent. Thus, in the latter formulation, there were present about 111 parts of foaming agent per 1,000 parts of nonionic detergent. A 0.1% solution of each of the foregoing formulations and a 0.002% solution of the butyramide were subjected to the foam testing procedure as described in Example 1. The results were as follows:

| Composition | Foam height (mm.) | | | | | | | |
|---|---|---|---|---|---|---|---|---|
| | Ascent (min.) | | | | Descent (min.) | | | |
| | 0.5 | 2 | 5 | 10 | 0.5 | 2 | 5 | 10 |
| Formulation A | 40 | 60 | 90 | 120 | 80 | 25 | 0 | 0 |
| Formulation B | 30 | 40 | 45 | 60 | 60 | 55 | 55 | 50 |
| 0.002% N-(n-dodecyl)-γ-hydroxybutyramide | 5 | 5 | 5 | 5 | 5 | 5 | 0 | 0 |

EXAMPLE 6

Two formulations including additives of this invention and conventional "detergent builders" were prepared. The basic composition, in parts by weight, consisted of 33.6 parts of trisodium phosphate, 19.4 parts of sodium sulfate, 14.9 parts of sodium carbonate, 7.6 parts of water-glass, 0.75 part of sodium carboxymethylcellulose, 10.75 parts of water and 13 parts of surfactant. With Formulation A, the surfactant consisted of 13 parts of nonionic detergent Pluracol polyol L–64. In Formulation B, the surfactant consisted of 0.26 part of N-(n-dodecyl)-γ-hydroxybutyramide and 12.74 parts of L–64 nonionic detergent. The compositions were subjected to the foam testing procedure as described in Example 1. The results obtained are as follows:

| Composition | Foam height (mm.) | | | | | | | |
|---|---|---|---|---|---|---|---|---|
| | Ascent (min.) | | | | Descent (min.) | | | |
| | 0.5 | 2 | 5 | 10 | 0.5 | 2 | 5 | 10 |
| Formulation A | 35 | 50 | 75 | 100 | 95 | 60 | 40 | 10 |
| Formulation B | 35 | 45 | 55 | 65 | 60 | 60 | 55 | 50 |
| 0.002% N-(n-dodecyl)-γ-hydroxybutyramide | 5 | 5 | 5 | 5 | 5 | 5 | 0 | 0 |

EXAMPLE 7

A 0.4% solution of a detergent composition was prepared consisting of Pluronic polyol L–44 as the nonionic detergent and N-(n-dodecyl)-γ-hydroxybutyramide as the foaming agent. The ratio of foaming agent to nonionic detergent was 490:1,000. It was found that the foam stability of the foregoing composition was enhanced as compared to a similar detergent composition wherein the foaming agent was omitted.

EXAMPLE 8

A detergent composition is prepared which consists of Tetronic–707 as the nonionic detergent and N-(n-dodecyl)-β-hydroxyethoxyacetamide as the foaming agent. The ratio of foaming agent to nonionic detergent is about 100:1,000. This composition is found to have enhanced foam stability.

EXAMPLE 9

A 0.1% solution of a detergent composition is prepared wherein Tetronic–504 is the nonionic detergent and N-(n-dodecyl)-β-hydroxyethoxyacetamide is the foaming agent. The ratio of foaming agent to nonionic detergent is 15:1,000. This composition has superior foam stability.

EXAMPLE 10

A 0.3% solution of Tetronic–704 and N-(n-dodecyl)-β-hydroxyethoxyacetamide is prepared. There is present 1 part of the acetamide per 1,000 parts of Tetronic–704. This composition has enhanced foam stability.

EXAMPLE 11

A 0.2% solution of a detergent composition is prepared. With this composition, a 50/50 mixture of N-(n-dodecyl)-β-hydroxyethoxyacetamide and N-(n-dodecyl)-γ-hydroxybutyramide is used as the foaming agent and Pluronic polyol L–64 is included as the nonionic detergent. The ratio of the total foaming agent to nonionic detergent is 50:1,000. The composition has enhanced foam stability.

The detergent compositions of this invention may be used as finished products or they may be combined with detergent builders or other detergent compositions to provide liquid, granular, or flaked detergent products. Any of the detergent builders known in the art may be used including among others, phosphates and polyphosphates such as tripolyphosphate and sodium hexametaphosphate, carbonates such as sodium carbonate and sodium sesquicarbonate, silicates such as sodium metasilicate, derivatives of cellulose such as sodium carboxymethylcellulose, water-glass, salts such as sodium sulfate, sodium borate, etc.

We claim:

1. A detergent composition which consists essentially of:
   (1) a water-soluble nonionic polyalkylene oxide detergent selected from the group consisting of
      (a) compounds of the formula:

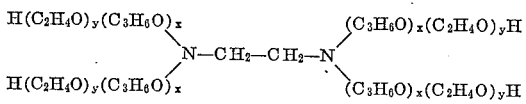

wherein $x$ is sufficiently large to provide a molecular weight of the oxypropylene chains of at least about 900 and wherein $y$ is sufficiently large to provide 30 to 90 percent of the total molecular weight of the compound, (b) compounds of the formula:

$$HO(C_2H_4O)_a(C_3H_6O)_b(C_2H_4O)_cH$$

wherein $b$ is an integer sufficiently high to provide a molecular weight of at least 900 for the oxypropylene base and wherein $a+c$ is an integer sufficiently high to provide 30 to 90 percent of the total molecular weight of the compound, and (c) condensation products of a fatty alcohol having 8 to 22 carbon atoms with 6 to 30 moles of ethylene oxide, and (2) a foam improving agent having the formula:

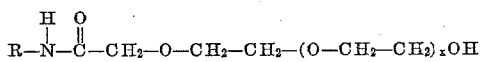

wherein R is a member selected from the group consisting of alkyl, alkenyl and alkynl radicals containing from 8 to 22 carbon atoms and $x$ is an integer from 0 to 100 wherein the ratio of said foaming agent to said water-soluble nonionic detergent is from one to about 500 parts per 1000 parts by weight and sufficient to improve the foaming power of said detergent.

2. A detergent composition as defined in claim 1, wherein the foam improving agent is N-(n-dodecyl)-β-hydroxyethoxy acetamide.

3. A detergent composition as defined in claim 1 wherein the foam improving agent is the one mol ethylene oxide adduct of N-(n-dodecyl)-β-hydroxyethoxy acetamide.

4. A detergent composition as defined in claim 1 wherein the foam improving agent is the two mol ethylene oxide adduct of N-(n-dodecyl)-β-hydroxyethoxy acetamide.

5. A detergent composition as defined in claim 1 wherein the foam improving agent is the four mol ethylene oxide adduct of N-(n-dodecyl)-β-hydroxyethoxy acetamide.

6. A detergent composition as defined in claim 1 wherein the foam improving agent is N-(n-octyl)-β-hydroxyethoxy acetamide.

7. A detergent composition as defined in claim 1 wherein the foam improving agent is N-(n-octadecyl)-β-hydroxyethoxy acetamide.

8. A detergent composition as defined in claim 1 wherein said nonionic polyalkylene oxide detergent corresponds to the following formula:

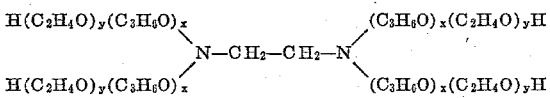

wherein $x$ is sufficiently large to provide a molecular weight of the oxypropylene chains of at least about 900 and wherein $y$ is sufficiently large to provide 30 to 90% of the total molecular weight of the compound.

9. A detergent composition as defined in claim 1 wherein said nonionic polyalkylene oxide detergent corresponds to the following formula:

$$HO(C_2H_4O)_a(C_3H_6O)_b(C_2H_4O)_cH$$

wherein $b$ is an integer sufficiently high to provide a molecular weight of at least 900 for the oxypropylene base and wherein $a+c$ is an integer sufficiently high to provide 30 to 90% of the total molecular weight of the compound.

10. A detergent composition as defined in claim 1 wherein said nonionic polyalkylene oxide detergent is a condensation product of a fatty alcohol having 8 to 22 carbon atoms with 6 to 30 moles of ethylene oxide.

References Cited by the Examiner

UNITED STATES PATENTS

| | | | |
|---|---|---|---|
| 1,970,578 | 8/1934 | Schoeller et al. | |
| 2,234,016 | 3/1941 | Woodhouse | 260—561 |
| 2,674,619 | 4/1954 | Lundsted. | |
| 2,677,700 | 5/1954 | Jackson et al. | |
| 2,702,278 | 2/1955 | Cupery et al. | 252—152 XR |
| 2,831,815 | 4/1958 | Klisch | 252—152 |
| 3,051,751 | 8/1962 | Levis et al. | 260—561 |

OTHER REFERENCES

Fine: "Soap and Chemical Specialties," September 1957, pp. 50–53, 113, 115 relied on.

ALBERT T. MEYERS, *Primary Examiner.*

JULIUS GREENWALD, *Examiner.*